United States Patent
Dyer

(10) Patent No.: US 11,678,652 B2
(45) Date of Patent: Jun. 20, 2023

(54) METHOD AND APPARATUS FOR ASPHYXIATING ARTHROPODS

(71) Applicant: Gordon Wayne Dyer, Hobbs, NM (US)

(72) Inventor: Gordon Wayne Dyer, Hobbs, NM (US)

(*) Notice: Subject to any disclaimer, the term of this patent is extended or adjusted under 35 U.S.C. 154(b) by 16 days.

(21) Appl. No.: 16/602,312

(22) PCT Filed: Dec. 27, 2017

(86) PCT No.: PCT/US2017/000098
§ 371 (c)(1),
(2) Date: Sep. 16, 2019

(87) PCT Pub. No.: WO2019/132854
PCT Pub. Date: Jul. 4, 2019

(65) Prior Publication Data
US 2022/0022443 A1    Jan. 27, 2022

(51) Int. Cl.
*A01M 1/20*    (2006.01)
*A01M 1/22*    (2006.01)
*A01N 53/00*    (2006.01)

(52) U.S. Cl.
CPC ............ *A01M 1/2094* (2013.01); *A01M 1/20* (2013.01); *A01M 1/226* (2013.01); *A01N 53/00* (2013.01); *A01M 2200/011* (2013.01)

(58) Field of Classification Search
CPC ............ A01M 1/226; A01M 2200/011; A01M 99/00; A01M 1/20; A01M 1/04
See application file for complete search history.

(56) References Cited

U.S. PATENT DOCUMENTS

| | | | | |
|---|---|---|---|---|
| 5,607,711 A | * | 3/1997 | Lagunas-Solar | A01M 1/226 426/248 |
| 6,638,475 B1 | * | 10/2003 | Lagunas-Solar | A23L 3/01 204/164 |
| 2010/0090129 A1 | * | 4/2010 | Klayman | A61L 9/20 250/492.1 |
| 2015/0174425 A1 | * | 6/2015 | Toyos | A61N 5/0613 606/127 |
| 2016/0219859 A1 | * | 8/2016 | Deal | C01B 13/10 |
| 2017/0156304 A1 | * | 6/2017 | Hori | A01M 1/226 |

FOREIGN PATENT DOCUMENTS

| | | | | | |
|---|---|---|---|---|---|
| JP | 2008104444 A | * | 5/2008 | | A01M 1/04 |
| KR | 20110133153 A | * | 12/2011 | | |
| WO | WO-2007118297 A2 | * | 10/2007 | | A01N 65/20 |
| WO | WO-2008050934 A1 | * | 5/2008 | | A01M 1/04 |
| WO | WO-2013069059 A1 | * | 5/2013 | | A01M 1/00 |
| WO | WO-2015079767 A1 | * | 6/2015 | | A01M 1/226 |
| WO | WO-2017135918 A1 | * | 8/2017 | | A01N 43/40 |

OTHER PUBLICATIONS

Machine translation of JP-2008104444-A (Year: 2022).*

* cited by examiner

*Primary Examiner* — Yvonne R Abbott-Lewis

(57) ABSTRACT

The present invention is about turning the gaseous envelope that encoats, protects certain arthropods from their external environment against them. It teaches to apply radiation to the arthropods body in order to dysfunction the exacting geometry needed to maintain this protective envelope. This absorbed radiation thus makes the arthropod vulnerable to pesticides and other chemical agents. It also interferes with the arthropods ability to adequately breathe through their plastron covering by forcing it to increase its rate of metabolism via this absorbed radiation.

9 Claims, No Drawings

METHOD AND APPARATUS FOR ASPHYXIATING ARTHROPODS

FIELD OF THE INVENTION

The present invention relates to applying radiant energy to heat-damage plastron-bearing arthropods by exceeding both their viable thermoregulatory limit and their concomitant viable respiratory limit, both inherently stressed in this absorbed radiation environment. More particularly, the present invention relates to damaging a plastron-bearing arthropod by using the inherent physical features of the gaseous plastron envelope that encoats and shields the athropod from its external environment against it by means of irradiating the arthropod with light.

BACKGROUND

Plastrons are an enclosed, cuticular envelope of air that protects many arthropods from direct contact with their external environment, creating a Cassie-Baxter state. This protective shield of air is particularly seen in the arthropods of subclass Acari (ticks, mites), and suborders Heteroptera (bed bugs), and, Anoplura (lice) (Eileen Hebets, Reginald F. Chapman, Surviving the flood: plastron respiration in the nontracheate arthropod. DigitalCommons@University of Nebraska-Lincoln, Journal of Insect Physiology 46:1 (January 2000), pp. 13-19), (Susan M. Villarreal, Truman State University, Plastron respiration in ticks, The 2005 Ecological Society of America Annual Meeting and Exhibition. Dec. 15-18, 2005), (Perez-Goodwyn, P. J. 2007 Anti-wetting surfaces in Heteroptera (Insecta): Hairy solutions to any problem. In Functional Surfaces in Biology. Springer), (Maria Soledad Leonardia, Claudio R. Lazzarib, Uncovering deep mysteries: The underwater life of an amphibious louse. Journal of Insect Physiology Volume 71, December 2014, Pages 164-169). In some arthropod species the plastron functions as a cuticular-derived external gill allowing for gas exchange. In other arthropod species, the plastron organized by the arthropod's cuticle is thought to both help protect the arthropod against desiccation and allowing it to respire, either by diffusion through its entire cuticle or via its plastron-protected spiracles (breathing apparatus) while still immersed in a wide variety of external environmental media.

Parasitic arthropods having this plastron ability are very difficult to eradicate because their plastron, by giving them an unwettable Cassie-Baxter state, largely shields them from any unamicable chemical exposure, such as pesticides. Ticks, mites, and lice are among those arthropods that have a plastron and cause humanity many problems both directly, as in the case of both rosacea and the inevitable eyelash follicle mite infestation and accompanying dry eye/lid inflammation found in adult humans, and indirectly such as in Lyme's disease, mange, arthropod-borne viral diseases, crop and livestock infestation and (perhaps most importantly) the current die-off of our critically needed pollinating honey bee population (Varroosis), (Parvaiz Anwar Rather, Iffat Hassan, Human Demodex Mite: The Versatile Mite of Dermatological Importance. Indian J Dermatol. 2014 January-February; 59(1): 60-66) (see also, Butovich I A, Lu H, McMahon A, Ketelson H, Senchyna M, Meadows D, Campbell E, Molai M, Linsenbardt E., Biophysical and morphological evaluation of human normal and dry eye meibum using hot stage polarized light microscopy. Invest Ophthalmol Vis Sci. 2014 Jan. 7; 55(1):87-101).

This unwettable state is due more to the exacting geometrical relationships between the various components that give rise to the plastron rather than because of any inherent unwettability of the component itself (i.e., two separately wettable components, become an unwettable combination when used together in the proper exacting arrangement with one another), (Thierry Darmanin, Frédéric Guittard, Superhydrophobic and superoleophobic properties in nature. Materials Today, Volume 18, Issue 5, June 2015, Pages 273-285). Further, due to the exacting physical strictures required to achieve such a Cassie-Baxter physical state, there are surprisingly few differences between the cuticles of plants and arthropods that share this unwettable property (Song Ha Nguyen, Hayden K. Webb, Peter J. Mahon, Russell J. Crawford and Elena P. Ivanova, Natural Insect and Plant Micro-/Nanostructsured Surfaces: An Excellent Selection of Valuable Templates with Superhydrophobic and Self-Cleaning Properties. Molecules 2014, 19(9), 13614-13630).

All of the treatments that try to eradicate the current on-going, plastron-bearing mite infestation of our honey bee population are themselves poisonous to bees and thus debilitating to the hive even if the bees manage to survive the treatment (David R. Tarpy, Joshua Summers, Managing Varroa Mites in Honey Bee Colonies. Department of Entomology Apicultural Program, North Carolina State University, April 2006). Oxalic acid, recently approved by EPA for use in controlling varroa mite infestation in honey bees is a very strong acid which means that it cannot be used except when greatly diluted and hence is less effective than it otherwise might be if it could be at higher concentrations. Because of its high acidity, oxalic acid is very dangerous to humans as well as to bees (Toxicity Category I, indicating the highest degree of toxicity) and thus special equipment must be used when handling and administering it.

Demodex mites, the obligate parasites that chronically infest the eyelid follicles and eyelid oil glands of all humans (and, in the case of Acne Rosea, the skin's sebaceous glands), like bee mites, are also plastron-bearing. Their plastron is one of the features that allows them to feed on their human host, yet still breathe, while remaining submerged within the now older, age-thickened oil of the eyelid's meibomian glands. The meibomian glands age-related increasing dysfunction is thought to be the main cause of dry eyes in middle-aged and older patients, and is called Meibomian Gland Dysfunction (MGD). Many practitioners believe that chronic, increasing, age-related demodex mite infestation of the meimbomian glands are the underlying cause of MGD because these relentless mites are present on the eyelids of every person 16 years of age or older and increase thereafter throughout life (Jingbo Liu, Hosam Sheh, Scheffer C. G. Tseng, Pathogenic role of Demodex mites in blepharitis. Curr Opin Allergy Clin Immunol. 2010 October; 10(5): 505-510).

Rewetting eye drops are commonly used to combat dry eye syndrome but, at best, they can only approximate the composition of naturally occurring tears. Further, they merely treat the symptoms and not of the underlying cause of dry eyes, which more than 70% of the time is due to meibomian gland dysfunction, MGD (wherein which the meibum oil product of the gland is too viscous to freely flow from the gland into the tears, thereby preventing the meibum from sealing in the moisture of the eye). In addition, in the commonly used preserved form, the accumulated toxicity of the preserved drops becomes problem after the use of too many drops in a given day. Compounding these issues, the use of drops is generally for an indefinite length of time and consequently, becomes a burdensome cost to the patient.

Attempts have been made to treat the cause of dry eyes due to MGD by heating the meibum oil in an attempt to thin its viscosity so that it can better flow into the tears, thereby functioning once again to prevent evaporation of the tears. In 2002 Goto used an elastic headband with eye patches to supply conductive heat to the external eyelids, though the heat source to the patches themselves was done with infrared radiant heat. The technique also envisioned the possible subsequent use of a variety of mechanical means to extract the now-softened meibum oil from the meibomian glands (Goto, E., et al., Treatment of Non-Inflamed Obstructive Meibomian Gland dysfunction by an Infrared Warm Compression Device, British Journal of Ophthalmology, Vol. 86 (2002), pp. 1403-1407). Though superior to simply using hot compresses, the weak points of this technique are: using only low amounts of energy because of otherwise creating cataract; using conduction heat rather than the inherently better plastron-penetrating radiant heat; using only sufficient heat to in order heat-soften the meibum rather than with the aim of heating enough to actually damage or kill the demodex mites infesting the meibomian gland; and, heating only the outside of the eyelid when the meibomian glands are positioned just beneath the surface of the inside of the eyelids and thus better heated from the inside or, better yet, from both the inside and the outside simultaneously. It teaches nothing towards the use radiation for use in any non-ocular situation such as in skin infestations, nor in controlling the current demodex infestation killing our honey bee population, nor about the beneficial effect of using this arthropod/plastron-directed radiation in conjunction with pharmaceuticals that are also directed towards attacking an arthropod, such as those disclosed in PCT/US2016/000014 and permethrin, by inherently increasing these pharmaceuticals' enthalpy rate of reaction towards the arthropod.

In 2015, Korb et al. filed a continuation-in-part patent, claiming priority from a patent (U.S. Pat. No. 8,915,253) entitled Method and Apparatus for Treating Gland Dysfunction Employing Heated Medium (U.S. Pat. App. No. 20150283402) for a method and apparatus to treat the dry eyes due to MGD by subjecting the Meibomian gland and its enclosed meibum oil to a variety of heat, light, vibrational, and now radio frequency energies while simultaneously debriding the Meibomian gland opening and extracting the now-softened meibum using vacuum force and pulsating bladders positioned on both the inside and outside of the eyelids in a complicated "milking" fashion. One weak point of this proposed treatment is that it treats the symptom of dry eye, as opposed to treatment of the underlying cause of the eyes being dry, demodex infestation of the meibomian glands. Further, outside of the expense of using such a complicated device, another weak point of this technique is that it directs and limits the radiant heat so as to heat-soften the meibum but weakly enough so as not to burn the patient by limiting the treatment skin temperature to 37 to 47 degrees Celsius, rather than with the aim of directing radiant arthropod-absorbable energy sufficient to actually damage or kill the demodex mites infesting the meibomian gland. Another drawback of Korb et al. is that it limits the radiation used to only those that raise the temperature of the meibum, thus inherently using skewing to radiant energy used to the red-to-infrared wavelength range. However, if the aim of the radiation is to damage the arthropod rather than the use of radiant heat per se then, for example, in the case of a red-colored arthropod, a blue-colored radiant light, though not a form of radiant heat nor useful for heating meibum, would heat-damage the red arthropod body because this blue wavelength energy would be absorbed, rather than reflected by the red/brown body of the arthropod, causing damage and/or death from the protein dysfunction due to denaturation, loss of membrane stability, neuronal dysfunction, and heat-related hypoxia to the plastron-bearing arthropod as mentioned above. In addition, another weak point of Korb et al.'s various continuation-in-part patents is that, by using any already-known-to-the-art cooling methods, it is possible to slightly cool the meibum and any possible obstructions within it to below 37 degrees Celsius and yet, by means of sufficient arthropod-absorbable radiant energy, to still cause damage and/or death from the protein dysfunction due to denaturation, loss of membrane stability, neuronal dysfunction, and heat-related hypoxia to the plastron-bearing arthropod. Yet another weak point of Korb et al. is that, out of fear of creating cataracts, it teaches away from treating confined spaces in front of an open eye, even if that may be the best way to treat demodex infestations and dry eyes. Finally, like Goto, it teaches nothing towards the use radiation in any non-ocular situation such as skin infestations, nor in controlling the current demodex infestation killing our Honey bee population, nor about the beneficial effect of using this plastron-directed radiation in conjunction with pharmaceuticals that are also directed towards attacking an arthropod, such as permethrin and those disclosed in PCT/US2016/000014, by inherently increasing these pharmaceuticals' enthalpy rate of reaction towards the arthropod.

Also in 2015, Toyos filed a patent application (U.S. Pat. App. No. 20150174425), claiming priority from two provisional patent applications (U.S. Provisional Application No. 61/675,490 filed Jul. 25, 2012, and U.S. Provisional Application No. 61/792,863 filed Mar. 15, 2013) for a method to treat the dry eyes due to MGD by activating fibroblasts in the lid area and thereby improving eyelid tone and concomitant meibomian gland function with the use of intense pulsed light. His technique, based on observations from dermatologists treating skin disorders in the peri-orbital region who noted that the intense pulsed light seemed to indirectly help their patients' dry eye problems. Perhaps because of concern over damage to the patients' eye and eyelashes, and so as not to infringe on Korb et al.'s patent, Toyos' patent description, though not his claims, teaches away from the use of this intense pulsed light directly in the meibomian gland region. Further Toyos, similarly to the teachings of dermatology from which it derives, teaches to limit the wavelength of light used to improve the dry eye and cosmetic appearance of the eyelids to the 600 nm to 700 nm (yellow-to-red) range. Therefore, like Korb, a weak point of Toyos is that, because demodex mites are a brownish color, the best wavelength of light to irradiate their bodies for maximum energy absorption is in the blue-to-violet end of the visible spectrum, not red light which would be reflected. Further, another drawback to Toyos is that it teaches away from directly and efficiently targeting the meibomian glands and eyelids with radiant energy. Instead Toyos teaches to inefficiently target the periocular region, rather than the eyelid margin where the meibomian glands and demodex mites are located, in the hope that, with enough intensity, this pulse of light will somehow reach the meibomian glands. In addition, Toyos teaches away from improving the eyelid appearance and health by eradicating the underlying, ubiquitous demodex mite infestation damaging these eyelids. Finally, like Goto and Korb, Toyos teaches nothing towards the use radiation in any non-ocular situation such as skin infestations, nor in controlling the current demodex infestation killing our Honey bee population, nor about the beneficial effect of using this plastron-directed radiation in conjunction with pharmaceuticals that are also directed towards attacking an arthropod, such as permethrin and those disclosed in PCT/US2016/000014. Nor does Toyos teach to inherently increase these pharmaceuticals' enthalpy rate of reaction towards the arthropod or by heat-distorting the geometry of the chemical constituents of the arthropod's plastron that are critical to shielding the arthropod from its surrounding, including pharmaceutical, environment.

Neither mammals nor honey bees have plastrons. In view of this, it would be desirable to harm plastron-bearing arthropods and thereby help control their infestations by using an agent or group of agents based on the inherent physical features of this plastron because it would not be inherently toxic to mammals or honey bees. Complete death of the mite is not actually necessary for such a plastron-related attack to be a success. Merely driving the infesting mite away from its host or sufficiently decreasing the arthropod's depredations on its host would be still be success (e.g., an demodex eyelid infestation, though asymptomatically present in juveniles, does not generally become severe enough to become symptomatic until later in life).

Cassie-Baxter state means the unwettable surface condition that results when, due to the hierarchical structure roughness (micro roughness covered with nano roughness) and angles of the solid surface, it is energetically more profitable (in a surface tension sense) for the liquid's molecules to adhere to one another than it is to fill in the valleys of the rough surface and actually touch the solid surface.

Kirchhoffs law means for an arbitrary body emitting and absorbing thermal radiation in thermodynamic equilibrium, the emissivity is equal to the absorptivity.

Cavity radiation means an object or system which absorbs radiation incident upon it and re-radiates this energy in a manner which is characteristic of this radiating system only, and not dependent upon the type of radiation which is incident upon it.

Enthalpy of reaction means the enthalpy change that occurs in a system when matter is transformed by a given chemical reaction.

Biological processes means the processes vital for a living organism to live. Biological processes are made up of many chemical reactions, such as cellular oxygen respiration or other events that are involved in the persistence and transformation of life forms.

Plastron means a cuticular bubble of air that protects many arthropods from direct contact with their external environment composed of multiple lipid-bearing (esters, steroids and monocyclic terpenes) chemical constituents surrounded proteins arising out of multiple layers of chitin hardened with calcium, that are all very exactingly, both chemically and geometrically, interrelated to one another, resulting in an unwettable Cassie-Baxter physical state.

Cellular respiration means the use of molecular oxygen (O2) as an electron acceptor for a set of metabolic reactions and processes that take place in the cells of organisms to convert biochemical energy from nutrients into chemical energy to fuel cellular activity. Cellular oxygen respiratory demand is the level molecular oxygen required by the cell to facilitate a given level of cellular respiration required to fuel a given level of cellular activity.

SUMMARY OF THE INVENTION

In one embodiment, the present invention provides a method for damaging the biological processes of an arthropod having a plastron, functioning proteins, membranes, neurons, and a cellular oxygen respiratory demand by irradiating the arthropod with arthropod-absorbable radiation sufficient to damage/interfere with the arthropod's biological processes. Examples of such arthropod applications include, but are not limited to, Demodex infestations of Honey bees, skin, eyelids, and meimbomian glands, as well as tick, mite, bed bug, and lice infestations.

The present invention also includes using arthropod-absorbable radiation to damage the arthropod by heat generated within the arthropod from the arthropod-absorbable radiation.

The present invention also includes using heat generated within the arthropod by the arthropod-absorbable radiation to damage/interfere with the biological processes of the arthropod by causing protein dysfunction due to denaturation, loss of membrane stability and neuronal dysfunction.

The present invention also includes using the arthropod-absorbable radiation in the violet-to-green portion of the visible spectrum (380 nm to 550 nm wavelength) to damage/interfere with the biological processes of the arthropod.

In a preferred embodiment, the present invention also includes damaging/interfering with the biological processes of an arthropod by using the heat generated by the arthropod-absorbable radiation to cause hypoxic damage to the arthropod by raising the arthropod's cellular oxygen respiratory demand higher than the amount of oxygen that can be supplied to the cell from the diffusion of oxygen across the arthropod's plastron. Optionally, this preferred embodiment includes also introducing a non-oxygen gas into the environment surrounding the irradiated arthropod in order to, by displacing the normal air available to the arthropod, accentuate the plastron-limited respiratory/oxygen supply problems forced upon the arthropod by this absorbed heat. Optionally, this preferred embodiment includes using reduced radiation intensity, but increased duration of radiation exposure because the object of the radiation as used here is to asphyxiate the arthropod via its plastron-limited respiratory ability rather than by damaging the arthropod by heat-caused protein denaturation and membrane damage.

The present invention also includes damaging/interfering with the biological processes of an arthropod by using heat generated by the arthropod-absorbable radiation to heat-distort the exacting geometrical interrelationships of the plastron's chemical constituents required to shield the arthropod from its surrounding environment and thereby diminish the functioning of the plastron in order to make the arthropod more susceptible to environmental-induced damage. The present invention also includes the prior or concomitant introduction of permethrin and/or those chemical agents disclosed in PCT/US2016/000014 into the arthropod's environment in order accentuate this environmental-induced damage. Further, the present invention includes accentuating the damage/interference with biological processes done to the arthropod by permethrin and those chemical agents disclosed in PCT/US2016/000014 by increasing the enthalpy rate of reaction of these pharmaceuticals by the heat generated by the subsequent or concomitant exposure of the arthropod to arthropod-absorbable radiation.

The present invention also includes the use of all known sources of the arthropod-absorbable radiation, including light bulbs, light emitting diodes (LED), distributed feedback lasers (DFB), and Bragg reflector lasers (DBR).

In another preferred embodiment, the present invention also includes reflecting the arthropod-absorbable radiation off a surface before being absorbed by the arthropod.

The present invention also includes the use of an apparatus to damage plastron-bearing arthropods. This apparatus consists of a housing that has at least one piece. This piece or pieces are shaped of as to define a confined space into which the arthropod-absorbable radiation and optional non-oxygenated gas are introduced in order to maximize damage to plastron-bearing arthropods. The housing that has interior and exterior surfaces that are optionally perforated with holes to allow for the introduction of non-oxygenated gas into the confined interior space. In the embodiment to be used on animal eyes, at least one of these surfaces is capable of having an anterior and posterior orientation relative to the animal's cornea, eyelid margin, and meibomian gland. The surfaces of this ocular embodiment are capable of movement, both relative to each other and relative to the eye. Further, in a preferred embodiment, this ocular embodiment can be as simple as having an optionally reflective metallic contact lens be the posterior surface of the housing and a radiation emitter such as a light bulb, a light emitting diode (LED), a distributed feedback laser (DFB), or a Bragg reflector lasers (DBR) held in front of the eye by the hand of a practitioner being the anterior surface, with the space these two surfaces defining the confined treatment space.

In all embodiments, the invention including having radiation emitters depending from at least one of the interior surfaces of the housing. These emitters direct the emitted radiation interiorly into the confined space defined between the housing's surfaces.

The present invention includes an embodiment for the treatment of demodex-related skin disorders such as Acne Rosea. In this embodiment, the skin itself is one of the housing's surfaces. The emitters are mounted on the other interior surface of the housing and direct their radiation towards the animal's skin. This emitting surface can be as simple as being a light bulb, a light emitting diode (LED), a distributed feedback laser (DFB), or a Bragg reflector lasers (DBR) held in the hand of a practitioner, or mounted on a stand that rests upon the skin being treated, with the space these two surfaces defining the confined treatment space. This embodiment optionally includes the prior or concomitant use permethrin and those chemical agents disclosed in PCT/US2016/000014 and optionally, the concomitant introduction of non-oxygenated gas into the confined interior space between the surfaces of the housing during the radiation emission.

The present invention includes the housing has at least one hole.

The present invention includes having this hole be capable of transmitting gas.

The present invention includes having this gas be non-oxygenated.

The present invention includes having the holes of the housing be large enough that the anteriorly oriented and posteriorly oriented pieces of the housing are physically separate from one another when the radiation is emitted within the interior of the confined space of the housing.

The present invention includes having the posteriorly oriented piece of the housing be a metallic contact lens worn on the cornea of the animal.

The present invention includes having at least one of the surfaces of the housing be reflective.

The present invention includes having the emitted radiation be within the violet-to-green portion of the visible spectrum (380 nm to 550 nm wavelength).

The present invention includes having permethrin and those chemical agents disclosed in PCT/US2016/000014, or other chemical agents, be placed into the interior of the housing prior to or concomitantly with the emission of the radiation.

The present invention includes having the permethrin, or other chemical agents placed within the interior of the housing, be placed only on to the eyelid margin, or skin, or meibomian gland of the animal before the radiation of the housing is emitted.

DESCRIPTION OF THE INVENTION

As mentioned above, the arthropod's plastron is gas-filled shield enveloping the arthropod body and/or spiracles. Like any other gas-filled, enclosed physical structure (e.g., a Thermos™ or a Styrofoam™ cup) the arthropod's plastron is insulative to convective or conductive heat, but not insulative to radiant energy. Thus, assuming reasonable spectral absorption, any radiant energy transmitted through the plastron is absorbed by the body of the arthropod and is inherently converted, at least in part, into conductive heat (see, Kirchhoff's law; see also, Cavity radiation, above). This radiant energy, now transmuted into conductive heat, is not easily dissipated by the arthropod because of its surrounding gas-filled plastron insulating envelope and thus leads to over-heating of the arthropod's body and respiratory apparatus, the spiracle (D. J. Crisp, W. H. Thorpe, The water-protecting properties of insect hairs. Discussions of the Faraday Society, Volume 3, 1918: 210-220). This excessive heat absorbed by the plastron-bearing arthropod leads to damage and/or death from the protein dysfunction due to denaturation, loss of membrane stability and neuronal dysfunction always seen with excessive heat (Somero, G. N. (1995). Proteins and temperature. Ann. Rev. Physiol. 57, 43-68). In addition, this absorbed heat inherently and detrimentally distorts the exacting geometrical relationships between the various components needed to maintain the plastron's unwettable state and thereby renders the plastron-bearing arthropod more vulnerable to pharmaceuticals that are also directed to attacking the arthropod, such as those disclosed in PCT/US2016/000014 and permethrin. Further, the enthalpy rate of reaction is inherently increased by the absorption of this radiant energy by the arthropod's enveloping plastron, thereby increasing the effective enthalpy rate of reaction of the pharmaceuticals introduced to attack the arthropod, such as those disclosed in PCT/US2016/000014 and permethrin.

Although, as mentioned above, the plastron allows the arthropod to live and respire in a great variety of external environments, this respiratory flexibility comes at the cost of decreased respiratory efficiency and control (Verberk, W. C. E. P. and Bilton, D. T. (2013). Respiratory control in aquatic insects dictates their vulnerability to global warming. Biol. Lett. 9, 20130473). Further, greater body temperature always leads to greater oxygen cellular respiratory demand in an attempt to prevent and/or repair the heat-induced protein dysfunction and membrane instability, mentioned above. But, because plastron-bearing arthropods are respiratorily limited due to the amount of oxygen that can diffuse across their plastron, they are less well equipped than non-plastron bearing creatures to deal with this increase in temperature (Wilco C. E. P. Verberk, David T. Bilton, Oxygen-limited thermal tolerance is seen in a plastron-breathing insect and can be induced in a bimodal gas exchanger. Journal of Experimental Biology 2015 218: 2083-2088). This heat vulnerability is particularly true when the surrounding environment is already oxygen-limited such as seen in a stagnant pond or, for example, a demodex mite living completely submerged in the oil of the meibomian gland sac or living head-down in the follicle of an eyelash (Ibid). In addition, this absorbed-radiation-induced heat vulnerability would also be accentuated if the surrounding atmospheric environment was artificially made oxygen-limited such as by replacing, either partially or totally, the normal air enclosed within a bee hive or within a confined space in front an eye, with a non-oxygen gas such as carbon dioxide or nitrogen. Further, this differential oxygen-dependent temperature vulnerability of plastron-bearing versus nonplastron-bearing creatures is inherently even more accentuated in, for example, the human eyelid once the radiator-cooling effect of the blood and lymph vessels present in the surrounding lid and skin tissue, or the evaporative cooling effect of sweating, are taken into account. Even arthropods with a plastron limited to covering their spiracle are vulnerable to the inherent increased heat-induced respiratory demand forced upon them because their plastron, as mentioned above, limits their oxygen supply. This respiratory inefficiency, induced by the absorbed radiation, leads to arthropod damage and death from hypoxia, in addition to any radiation-induced protein dysfunction and membrane instability that they would also suffer.

The foregoing description is intended to be illustrative and is not to be taken as limiting. Other variations within the spirit and scope of this invention are possible and will be apparent to those skilled in the art.

BRIEF DESCRIPTION OF THE OCULAR APPARATUS

The ocular apparatus portion of the present invention consists of a metallic contact lens resting upon an open eye similar to those designed to protect the eye during laser eyelid surgeries, such as seen in U.S. Pat. Nos. 5,918,600, and 6,123,081. However, in order to irradiate a confined space in front the open eye so as to maximize exposure of the demodex mites/plastron-bearing arthropod to radiant energy and to potentially house/enclose non-oxygen gases, the present invention includes two embodiments: in the first embodiment, short-barreled (1 to 2 mm) radiant energy producers are mounted on the front of the metallic contact lens that direct their produced radiant energy anteriorly through the demodex-infested meibomian glands/eyelashes and towards a second radiant energy producing surface (potentially hand-held) located anterior to the eye that directs its radiant energy posteriorly through these demodex-infested meibomian glands/eyelashes and back towards the metallic contact lens; in the second embodiment, though otherwise the same as the first embodiment, either the metallic contact lens or the anterior surface are reflective, the radiant energy producers are mounted on only one of these two structures, and the demodex-infested meibomian glands/eyelashes are directly irradiated by the radiant energy producers that are mounted on the one structure and indirectly irradiated by the radiant energy reflecting back towards them off the reflective surface of the second structure/surface.

Both embodiments encompass using all known radiant energy producers, including all known LED (light emitting diodes), all known distributed feedback (DFB) lasers and all known distributed Bragg reflector (DBR) lasers. Both embodiments encompass optionally using all known cooling methods, including blowing room-temperature gases or cooled gases on to the two structures and on to the meibomian glands and their surrounding ocular tissues, in order to prevent heat damage to the surrounding ocular bulbi structures such as induced cataract formation and glaucoma, and to optionally keep the meibum and any possible obstructions located within it below 37 degrees Celsius.

I claim:

1. A method of damaging the biological processes of Acari, Heteroptera, and Anoplura arthropods, present on mammals and bees, having a plastron, a color, functioning proteins, membranes, neurons, and a cellular oxygen respiratory demand, the method comprising: irradiating the arthropod With visible light selected from the group consisting of blue light and violet light.

2. The method of claim 1, wherein the light damages the arthropod by heat generated within the arthropod.

3. The method of claim 2, wherein the heat generated within the arthropod by the light damages or interferes with the biological processes of the arthropod by causing protein dysfunction due to denaturation, loss of membrane stability and neuronal dysfunction.

4. The method of claim 2, wherein the damage or interference with biological processes to the arthropod by the heat generated by the light is hypoxic damage caused by the generated heat raising the arthropod's cellular oxygen respiratory demand higher than the amount of oxygen that can be supplied to the cell from diffusion of oxygen across the arthropod's plastron.

5. The method of claim 2, wherein the damage or interference with biological processes to the arthropod by the heat generated by the light is environmental-induced damage caused by heat-distorting the exacting geometrical interrelationships of the plastron's chemical constituents required to shield the arthropod from its surrounding environment.

6. The method of claim 5, wherein the surrounding environmentally-induced damage to the arthropod includes damages resulting from exposure of the arthropod to the group consisting of: permethrin, chemical agents, pesticides, and pharmaceuticals.

7. The method of claim 2, wherein the damage or interference with biological processes to the arthropod by the heat generated by the is done by increasing the enthalpy rate of reaction of compounds selected from the group consisting of: permethrin, chemical agents, pesticides, and pharmaceuticals.

8. The method of claim 1, wherein the source of the light is selected from the group consisting of: light bulbs; light emitting diodes (LED); distributed feedback lasers (DFB); and, Bragg reflector lasers (DBR).

9. The method of claim 8, wherein the light is reflected off a surface before being absorbed by the arthropod.

* * * * *